US010831874B2

(12) United States Patent
Miyakawa

(10) Patent No.: US 10,831,874 B2
(45) Date of Patent: Nov. 10, 2020

(54) INFORMATION PROCESSING APPARATUS, INFORMATION PROCESSING METHOD AND PROGRAM

(71) Applicant: CANON KABUSHIKI KAISHA, Tokyo (JP)

(72) Inventor: Takumi Miyakawa, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 59 days.

(21) Appl. No.: 15/444,542

(22) Filed: Feb. 28, 2017

(65) Prior Publication Data

US 2017/0255771 A1 Sep. 7, 2017

(30) Foreign Application Priority Data

Mar. 1, 2016 (JP) .................................. 2016-039299

(51) Int. Cl.
*G06F 21/36* (2013.01)
*G06F 21/32* (2013.01)
*G06F 3/0481* (2013.01)
*G06F 3/0482* (2013.01)
*G06F 3/0488* (2013.01)

(52) U.S. Cl.
CPC ............ *G06F 21/36* (2013.01); *G06F 3/0482* (2013.01); *G06F 3/04817* (2013.01); *G06F 3/04883* (2013.01); *G06F 21/32* (2013.01)

(58) Field of Classification Search
CPC .......... G06F 21/32; G06F 21/36; G06F 3/048; G06F 3/04817; G06F 3/0482; G06F 3/0488; G06F 3/04883
See application file for complete search history.

(56) References Cited

U.S. PATENT DOCUMENTS 9,015,798 B1 * 4/2015 Matsuoka ............... G06F 21/31
726/16
9,176,614 B2 * 11/2015 Alameh ................... G06F 21/32
9,547,762 B2 * 1/2017 Lu ....................... G06K 9/00087
(Continued)

FOREIGN PATENT DOCUMENTS

CN          102611794 A       7/2012
CN          103809906 A       5/2014
(Continued)

OTHER PUBLICATIONS

Notice of Reasons for Refusal issued by the Japanese Patent Office dated Oct. 29, 2019 in corresponding Japanese Patent Application No. 2016-039299 with English translation.
(Continued)

*Primary Examiner* — Linglan E Edwards
(74) *Attorney, Agent, or Firm* — Carter, DeLuca & Farrell LLP

(57) ABSTRACT

The invention aims to enable, with respect to an application for which user authentication is necessary, to perform an operation for selecting the application and an operation for the user authentication as easily as possible. A swipe of an icon as an example of the operation for selecting the application to be activated and subsequent acceptance of a touching operation of a finger to a sensor detection area of a fingerprint authenticating device as an example of the operation for the user authentication are performed based on a series of operations.

12 Claims, 12 Drawing Sheets

(56) References Cited

U.S. PATENT DOCUMENTS

| | | |
|---|---|---|
| 9,703,941 B2 * | 7/2017 | Lee .......................... G06F 3/00 |
| 9,946,861 B2 * | 4/2018 | Yoon ..................... G06F 21/32 |
| 10,229,258 B2 * | 3/2019 | Kang ..................... G06F 21/32 |
| 2013/0120294 A1 | 5/2013 | Sun et al. |
| 2013/0187753 A1 * | 7/2013 | Chiriyankandath .. G06F 3/0488 340/5.51 |
| 2014/0137049 A1 * | 5/2014 | Jung ..................... H04W 12/06 715/847 |
| 2016/0042166 A1 * | 2/2016 | Kang ..................... G06F 21/32 726/7 |
| 2016/0092018 A1 * | 3/2016 | Lee ......................... G06F 21/32 345/173 |
| 2016/0292410 A1 * | 10/2016 | Lu ...................... G06K 9/00087 |
| 2017/0083694 A1 * | 3/2017 | Mardikar ................ G06F 21/32 |
| 2018/0211030 A1 * | 7/2018 | Kim ........................ G06F 21/45 |
| 2018/0365477 A1 * | 12/2018 | Seol ...................... G06F 3/0486 |
| 2019/0005571 A1 * | 1/2019 | Cho ........................ G06F 3/048 |

FOREIGN PATENT DOCUMENTS

| | | |
|---|---|---|
| JP | 2004334788 A | 11/2004 |
| JP | 2010231618 A | 10/2010 |
| JP | 2013-140440 A | 7/2013 |
| JP | 2013228953 A | 11/2013 |
| JP | 2014-191653 A | 10/2014 |
| KR | 10-20114-0062233 A | 5/2014 |
| KR | 10-2015-0026787 A | 3/2015 |

OTHER PUBLICATIONS

Notice of Reasons for Refusal issued by the Korean Intellectual Property Office dated Oct. 21, 2019 in corresponding Korean Patent Application No. 10-2017-0024656 with English translation.

Notice on the First Office Action issued by the National Intellectual Property Administration of the People's Republic of China dated Jun. 15, 2020 in corresponding CN Patent Application No. 201710099786.0, with English translation.

* cited by examiner

FIG. 3

| | APPLICATION TYPE | GESTURE VECTOR |
|---|---|---|
| 1 | MAIL APPLICATION | |
| 2 | BROWSER APPLICATION | |
| 3 | TELEPHONE APPLICATION | |

INFORMATION PROCESSING APPARATUS, INFORMATION PROCESSING METHOD AND PROGRAM

BACKGROUND OF THE INVENTION

Field of the Invention

The invention relates generally to an information processing apparatus, an information processing method and a program, and, more specifically to an information processing apparatus, an information processing method and a program which are suitable for use in executing an application.

Description of the Related Art

A touch input type terminal device such as a smartphone, a tablet or the like activates an application selected by a user by a tap of an application activation icon displayed on the screen thereof. On the other hand, it is not preferable from the viewpoint of security that an application is executed by an instruction from an arbitrary user. To cope with such a situation, there is a method of ensuring security by user authentication when executing the application.

However, when a user who expects to execute an application by selection of the relevant application is urged to perform a new operation, i.e., an operation for user authentication, independent of the selection of the relevant application, there is a fear that these operations are severely divided and thus become complicated.

Japanese Patent Application Laid-Open No. 2014-191653 discloses the method of selecting an application according to a user authenticating method. That is, in the relevant method, the application to be activated at the time of success of the user authentication by fingerprint authentication and the application to be activated at the time of success of the user authentication by a passcode are made different from each other. The application is hereby selected by the operation for the user authentication.

Besides, Japanese Patent Application Laid-Open No. 2013-140440 discloses the method of disposing a fingerprint authenticating device on a swipe unlocking operation line. In the relevant method, the operation for unlocking and the operation for user authentication by fingerprint authentication are within the same procedure, so that a user is not conscious of the operation for the user authentication.

However, in the technique described in Japanese Patent Application Laid-Open No. 2014-191653, it is impossible to select an arbitrary application which is notified on the screen. Further, in the technique described in Japanese Patent Application Laid-Open No. 2013-140440, any method of performing the unlocking when executing an arbitrary application is not disclosed.

The invention has been completed in view of such problems as described above, and an object of the invention is to enable, with respect to an application for which user authentication is necessary, to perform an operation for selecting the application and an operation for performing the user authentication as easily as possible.

SUMMARY OF THE INVENTION

An information processing apparatus according to the invention is characterized by comprising: an accepting unit configured to accept a first operation of indicating an instruction to select an application; an acquiring unit configured to acquire authentication information to be used for user authentication, based on a second operation; a tracking unit configured to track that the first operation is continuously performed so as to approach an area where the second operation is performed, and the second operation is performed as a part of the first operation; and an activating unit configured to activate the application selected by the first operation, in a case where a predetermined user is identified based on the authentication information.

According to the invention, it is possible to enable, with respect to an application for which user authentication is necessary, to perform an operation for selecting the application and an operation for the user authentication as easily as possible.

Further features of the present invention will become apparent from the following description of exemplary embodiments with reference to the attached drawings.

BRIEF DESCRIPTION OF THE DRAWINGS

FIG. 3 is a diagram for illustrating a gesture table.

DESCRIPTION OF THE EMBODIMENTS

Hereinafter, embodiments will be described with reference to the accompanying drawings. It should be noted that the following embodiments are merely examples, and the invention is not limited to the following embodiments.

First Embodiment

Figure 1:
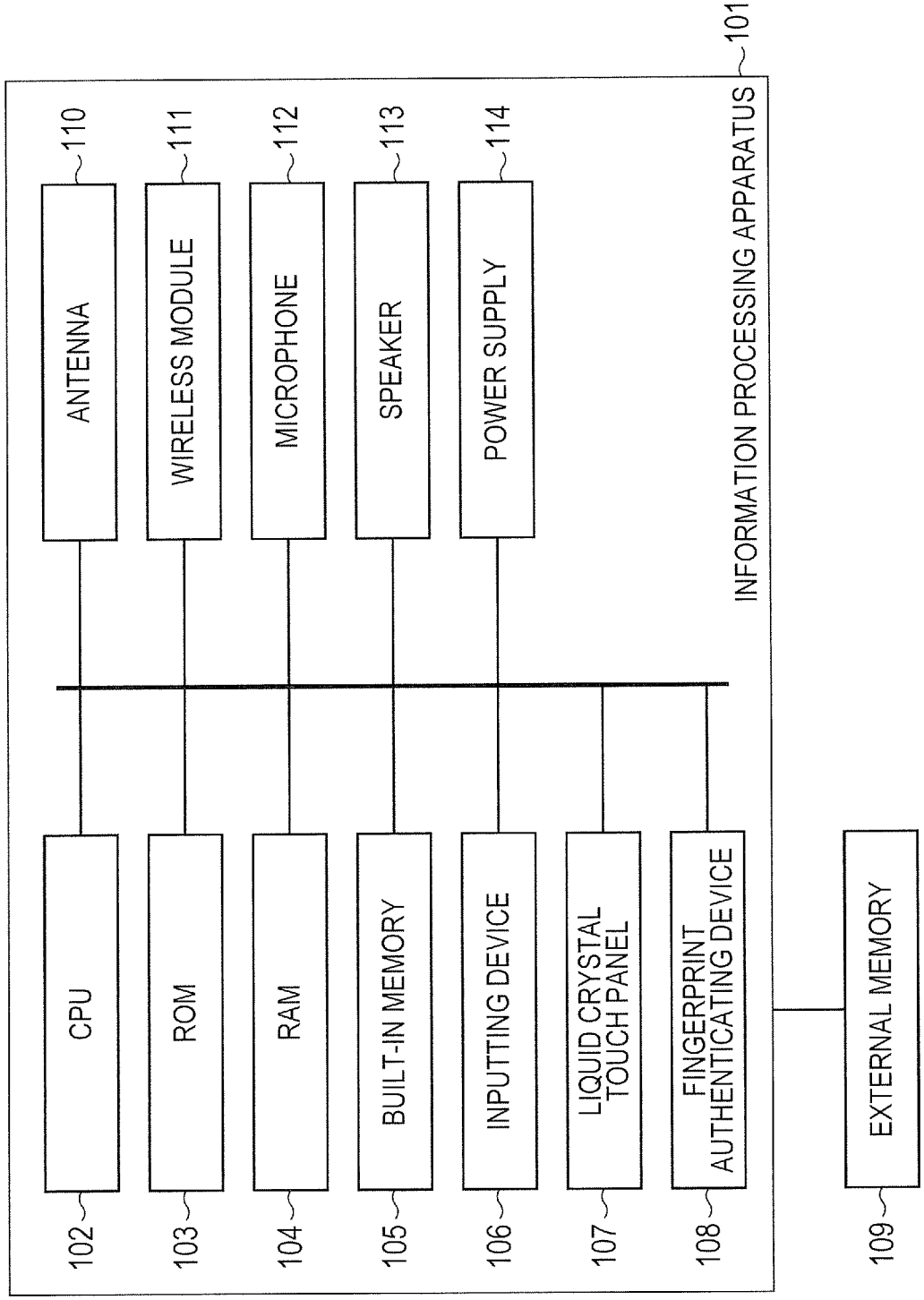
FIG. 1 is a diagram for illustrating the hardware constitution of an information processing apparatus.

FIG. 1 is a block diagram for illustrating an example of the hardware constitution of an information processing apparatus 101. In the present embodiment, a case where the information processing apparatus 101 is a mobile phone will be described as an example. The information processing apparatus 101 is not limited to the mobile phone. For example, a touch input type terminal device such as a tablet terminal may be used as the information processing apparatus 101.

An example of the hardware constitution of the information processing apparatus 101 will be described below.

A CPU (central processing unit) 102 is the device which controls the entire apparatus, and calculates and processes various data. The CPU 102 decompresses the program stored in a later-described ROM (read only memory) 103 into a RAM (random access memory) 104, and executes the decompressed program.

The ROM 103 is the storage device which reads information once written. The ROM 103 stores therein a program or the like for performing the process according to a flow chart to be described later.

The RAM 104 is the storage device for which data writing and data reading are performed temporarily. The RAM 104 stores therein temporary values of each program.

Each of a built-in memory 105 and an external memory 109 is the external storage device in which contents of applications are stored.

An inputting device 106 is mounted on the information processing apparatus 101 as members such as a button and the like by which a user performs an input operation to the information processing apparatus 101. The inputting device 106 has, for example, a power button, a volume button, a home button, and the like. As just described, the plurality of the inputting devices 106 are mounted on the information processing apparatus 101.

A liquid crystal touch panel 107 is the display which is provided with an electrostatic capacitance type input function. Incidentally, the touch panel may be realized by a device other than the liquid crystal, for example, it may be realized by using an organic EL (electroluminescence) device, an electronic paper, or the like.

A fingerprint authenticating device 108 is the device which senses a fingerprint and thus acquires fingerprint information indicating the sensed fingerprint. In the present embodiment, a case where the fingerprint authenticating device 108 is mounted on the home button which is one of the inputting devices 106 and a case where the fingerprint authenticating device 108 is mounted on the entire liquid crystal touch panel 107 will be described as examples (the details thereof will be described later).

An antenna 110 is the wireless communication antenna which is suitable for communication in a mobile phone network (e.g., W-CDMA (Wideband Code Division Multiple Access) system, GSM (Global System for Mobile communication (registered trademark)), and a wireless LAN (local area network) (e.g., IEEE (The Institute of Electrical and Electronics Engineers, Inc.) 802.11 system).

A wireless module 111 is the wireless function block which is suitable for communication in the mobile phone network and the wireless LAN. For example, the wireless module 111 is the device which includes an RF (radio frequency) or MAC (Media Access Control) process chip for performing a process of layer 2 or less in the OSI (Open Systems Interconnection) reference model.

A microphone 112 is the sensor which collects sounds during a call.

A speaker 113 is the device which conducts the uttered voice of the person at the other end of the line during a call.

A power supply 114 is the device which supplies and charges power to the information processing apparatus 101. The power supply includes a battery and a charging device.

Figure 2:
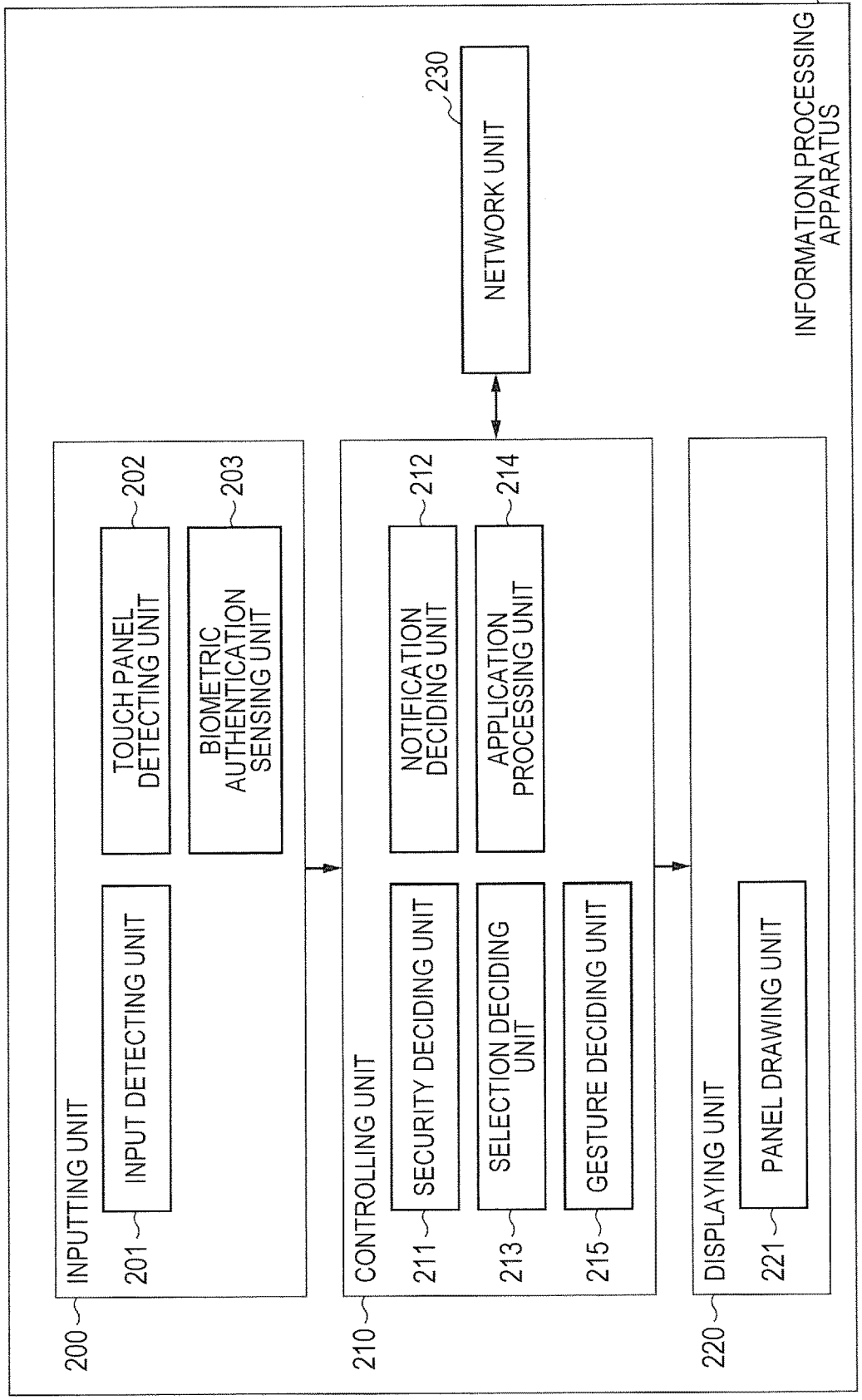
FIG. 2 is a diagram for illustrating the functional constitution of the information processing apparatus.

FIG. 2 is a block diagram for illustrating an example of the functional constitution of the information processing apparatus 101 according to the present embodiment. Hereinafter, an example of the components of the information processing apparatus 101 will be described with reference to FIG. 2.

The inputting unit 200 is the input function unit for the information processing apparatus 101. The inputting unit 200 includes an input detecting unit 201, a touch panel detecting unit 202 and a biometric authentication sensing unit 203. The inputting unit 200 transmits input information to a later-described controlling unit 210.

The input detecting unit 201 detects a signal from the inputting device 106 such as a button mounted on the information processing apparatus 101, and then transmits a type of an event to the controlling unit 210 in response to detected signal.

The touch panel detecting unit 202 decides, from the touch input information acquired from the liquid crystal touch panel 107, whether or not a user's finger or the like is touching the screen of the liquid crystal touch panel 107. As a result of the decision, when the user's finger or the like is touching the screen of the liquid crystal touch panel 107, the touch panel detecting unit 202 transmits a signal indicating the touched portion to the controlling unit 210.

The biometric authentication sensing unit 203 extracts the feature of the fingerprint from the fingerprint information acquired from the fingerprint authenticating device 108. As just described, in the present embodiment, a case where a user authenticating method is a fingerprint authenticating method will be described as an example. However, it should be noted that the user authenticating method is not limited to the fingerprint authenticating method. As the user authenticating method, for example, a vein authenticating method or another type of biometric authenticating method may be adopted.

The controlling unit 210 controls each functional unit of the information processing apparatus 101. For example, the controlling unit 210 discriminates input information from the inputting unit 200 or a network unit 230, performs various processes according to the result of the discrimination, and then externally outputs the results of the various processes by using a displaying unit 220 or the network unit 230.

The controlling unit 210 includes a security deciding unit 211, a notification deciding unit 212, a selection deciding unit 213, an application processing unit 214, and a gesture deciding unit 215.

The security deciding unit 211 decides whether or not the user authentication succeeds, based on the information (the feature of the fingerprint) extracted by the biometric authentication sensing unit 203 or the information (the pattern of a finger operation input to the screen of the liquid crystal touch panel 107) acquired by the touch panel detecting unit 202.

The notification deciding unit 212 decides whether notification information from the application is present or absent, and, when the notification information is present, displays the notification information using the later-described displaying unit 220. The notification information is displayed, for example, on a locked screen. For example, the notification information includes e-mail reception information, telephone incoming information and the like, and generally includes information to be notified to a user by the application. In the present embodiment, it is assumed that the notification information is displayed with an icon. In addition, in the following description, application which has issued notification information is referred to as a notification-state application (i.e., an application in a notification state) as necessary.

The selection deciding unit 213 decides the application selected by the user. For example, the selection deciding unit 213 decides whether or not the user has selected the notification information (icon) displayed by the notification deciding unit 212, via the liquid crystal touch panel 107.

The application processing unit 214 performs an individual process for each of the applications.

The gesture deciding unit 215 decides a type of the application selected by the user with gesture input.

Figure 3:
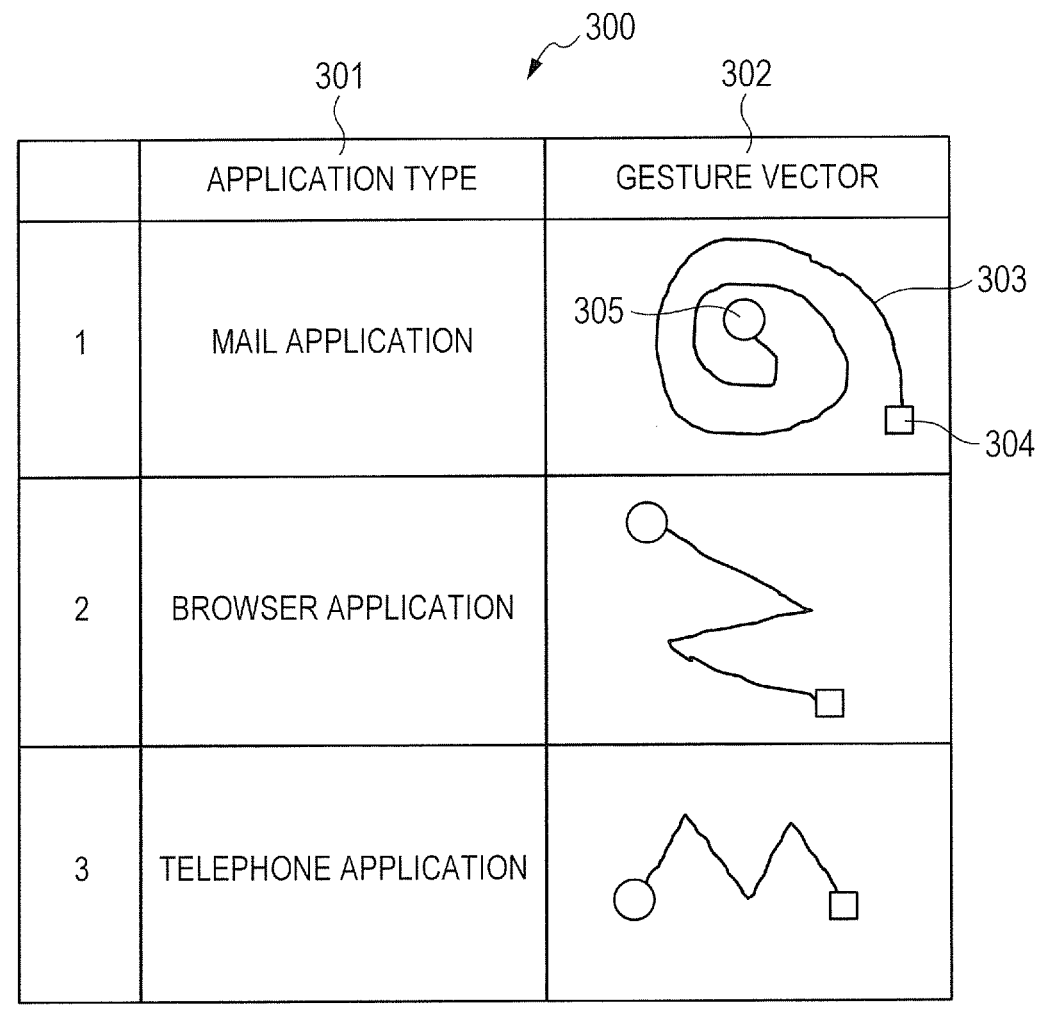

FIG. 3 is a diagram for illustrating an example of a gesture table 300. In the present embodiment, the gesture deciding unit 215 decides, by using the gesture table 300, the type of the application selected by the user with the gesture input.

The gesture table 300 is the table in which an application type 301 and a gesture vector 302 are stored in association with each other.

The gesture vector 302 is a reference vector to be compared with a pattern of finger input to the liquid crystal touch panel 107. For example, a start point, an end point and a shape of a gesture are specified as information indicating the feature amount of the gesture, by the gesture vector 302. The gesture vector 302 is used to decide whether or not the feature amounts of a pattern input to the liquid crystal touch panel 107 and the gesture vector 302 match each other.

In FIG. 3, for example, a gesture vector 303 indicates that this vector is expected to be input to the liquid crystal touch panel 107 from a start point 305 and up to an end point 304 via a spiral trajectory. When such gesture input is performed, the gesture deciding unit 215 decides that the type of the application selected by the relevant gesture input is a mail application.

Returning to the description of FIG. 2, the displaying unit 220 includes a panel drawing unit 221. The displaying unit 220 draws a drawing instruction from the controlling unit 210 as an external output, by using the panel drawing unit 221. The panel drawing unit 221 draws the content of the drawing instruction by using the liquid crystal touch panel 107. The network unit 230 performs communication with an external terminal of the information processing apparatus 101 by using the wireless module 111 and the antenna 110.

In the present embodiment, the above functional units are exemplarily described by a case where the later-described CPU 102 decompresses the program stored in the ROM 103 into the RAM 104 and then performs the process according to the later-described flow chart on the basis of the decompressed program. However, it is not always necessary for the functional unit to perform the operation like this. For example, it is possible to have the same effect by an apparatus which realizes the above functional units by hardware.

Figure 4:
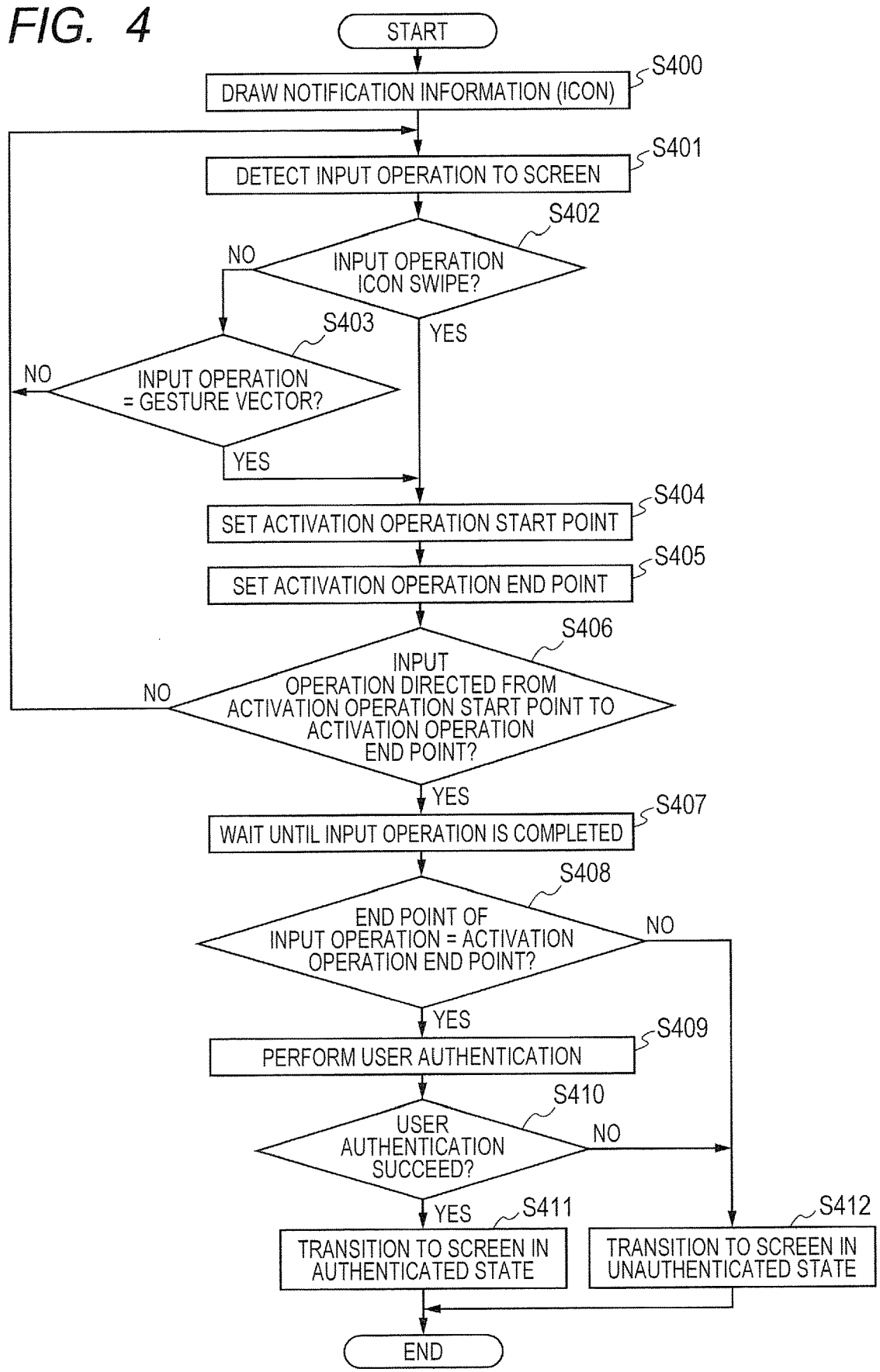
FIG. 4 is a flow chart for explaining a first example of the process to be performed by the information processing apparatus.

FIG. 4 is a flow chart for explaining an example of the process to be performed by the information processing apparatus 101 when the application issuing the notification information is activated in accordance with an operation for application selection including an operation for user authentication.

In S400, after receiving the notification information issued by the application processing unit 214, the notification deciding unit 212 draws the icon corresponding to the application from which the notification information was issued, by using the panel drawing unit 221. The relevant icon is the icon which allows to activate the application.

Next, in S401, the selection deciding unit 213 detects the content of the input operation to the screen of the liquid crystal touch panel 107.

Next, in S402, the selection deciding unit 213 decides whether or not the input operation to the screen is a swipe of the icon which issued the notification information.

As a result of the decision, when the input operation to the screen is not the swipe of the icon which issued the notification information, the process proceeds to S403. In S403, the gesture deciding unit 215 decides whether or not the gesture vector (the start point, the end point and the shape of the gesture) specified by the input operation to the screen matches any of the gesture vectors 302 registered in the gesture table 300.

As a result of the decision, when the gesture vector specified by the input operation to the screen does not match any of the gesture vectors 302 registered in the gesture table 300, the process returns to S401.

In S402, when the selection deciding unit 213 decides that the input operation to the screen is the swipe of the icon which issued the notification information, the process proceeds to S404. Also, in S403, when the gesture deciding unit 215 decides that the gesture vector specified by the input operation to the screen matches any of the gesture vectors 302 registered in the gesture table 300, the process proceeds to S404.

In S404, the selection deciding unit 213 sets the start point of the operation for activating the application. In the following description, the start point of the operation for activating the application will be referred to as an activation operation start point as necessary.

When the input operation to the screen is the swipe of the icon (when the process proceeds from S402 to S404), the selection deciding unit 213 sets the start position of the swipe for the icon as the activation operation start point. On the other hand, when the input operation to the screen is a gesture (when the process proceeds from S403 to S404), the position of the end point of the gesture is set as the activation operation start point. The activation operation start point may be a position itself (the position at which the swipe of the icon is started, or the position at the end point of the gesture), or an area within a preset range including the relevant position.

Further, the selection deciding unit 213 specifies the application which is the activation target (hereinafter, referred to as the activation-target application). When the process proceeds from S402 to S404, the selection deciding unit 213 specifies the application corresponding to the swiped icon as the activation-target application. When the process proceeds from S403 to S404, the selection deciding unit 213 specifies, in the gesture table 300, the application corresponding to the gesture vector 302 which matches the gesture vector specified by the input operation, as the activation-target application.

Next, in S405, the security deciding unit 211 sets the end point of the operation for activating the application. In the following description, the end point of the operation for activating the application will be referred to as an activation operation end point as necessary. The activation operation end point changes depending on the implementation form of the fingerprint authenticating device 108 which is an example of the biometric authenticating device. In a case where the fingerprint authenticating device 108 is mounted as the inputting device 106 at a position other than the liquid crystal touch panel 107, the security deciding unit 211 sets the activation operation end point at the position of the fingerprint authenticating device 108.

In this case, out of the intersections between the (virtual) straight line mutually connecting (the center of) the activation operation end point and (the center of) the fingerprint authenticating device 108 with each other and the edge of the liquid crystal touch panel 107, an area which includes the position closest to the fingerprint authenticating device 108 is set as an authentication acceptance start point.

Incidentally, out of the intersections between the straight line mutually connecting the activation operation end point and the fingerprint authenticating device 108 with each other and the edge of the liquid crystal touch panel 107, the authentication acceptance start point may be a position itself closest to the fingerprint authenticating device 108, or may be set as an area within a preset range including the relevant position. As described above, in the present embodiment, for example, an example of the detection area is realized by the authentication acceptance start point.

When the fingerprint authenticating device 108 is mounted on the liquid crystal touch panel 107, the security deciding unit 211 sets the surrounding area which includes the icon which issued the notification information, as the fingerprint authentication decision area. Then, the security deciding unit 211 sets the position assumed as the end point of the swipe performed to the icon, as the activation operation end point.

When pattern authentication is performed, the security deciding unit 211 sets the activation operation end point at a position offset from the edge of the liquid crystal touch panel 107. That is, in the drawing area of a pattern authentication view 703 to be used for pattern input, in order to be able to draw at least the area that a user initially performs input, the security deciding unit 211 sets the activation operation end point at the position which avoids the relevant area.

As just described, in the present embodiment, for example, an example of authentication information is realized by the information of a user's fingerprint or a pattern for the pattern authentication.

Incidentally, the activation operation end point may be a position itself (the position of the fingerprint authenticating device 108, the position assumed as the end point of the swipe performed to the icon, or the position offset from the edge of the liquid crystal touch panel 107), or an area within a preset range including the relevant position.

In S406, the selection deciding unit 213 decides whether or not the direction of the input operation to the liquid crystal touch panel 107 is headed from the activation operation start point set in S404 to the activation operation end point set in S405 (or whether or not the input operation is directed from the activation operation start point to the activation operation end point). As a result of the decision, when the direction of the input operation is not headed from the activation operation start point to the activation operation end point, the process returns to S401. On the other hand, when the direction of the input operation is headed from the activation operation start point to the activation operation end point, the process proceeds to S407.

In S407, the selection deciding unit 213 waits until the input operation to the liquid crystal touch panel 107 is stopped. When the stop of the input operation to the liquid crystal touch panel 107 is confirmed, the selection deciding unit decides that the input operation is completed.

Next, in S408, the selection deciding unit 213 decides whether or not the end point of the input operation to the liquid crystal touch panel 107 is the activation operation end point set in S405.

As a result of the decision in S408, when the end point of the input operation to the liquid crystal touch panel 107 is not the activation operation end point, the process proceeds to S412.

In S412, the security deciding unit 211 instructs the application processing unit 214 to transition to the screen in an unauthenticated state. Upon receiving the relevant instruction, the application processing unit 214 activates the activation-target application specified in S404 as an unauthenticated state mode. Instead of such application activation, the application processing unit 214 may end the activation of the activation-target application specified in S404, as an error due to non-authentication. Then, the process according to the flow chart of FIG. 4 ends.

On the other hand, as a result of the decision in S408, when the end point of the input operation to the liquid crystal touch panel 107 is the activation operation end point, the process proceeds to S409.

In S409, the security deciding unit 211 performs the user authentication. When biometric authentication is used as the user authentication, the security deciding unit 211 performs the user authentication by using the biometric authentication sensing unit 203. When the fingerprint authenticating device 108 is mounted as the inputting device 106 at the position other than the liquid crystal touch panel 107, it is preferable to perform such a process as described below. That is, the security deciding unit 211 decides whether or not the position of the input operation by the user reaches the authentication acceptance start point set in S405. As a result of the decision, when the position of the input operation by the user reaches the authentication acceptance start point, the security deciding unit 211 activates the fingerprint authenticating device 108 (that is, the state in which fingerprint recognition can be performed).

When the pattern authentication is used as the user authentication, the security deciding unit 211 draws, by using the panel drawing unit 221, a pattern authentication view, which is the input area for an authentication pattern, on the liquid crystal touch panel 107. Then, the security deciding unit 211 draws, by using the panel drawing unit 221, a pattern corresponding to the input operation to the pattern authentication view, on the liquid crystal touch panel 107, identifies the relevant pattern, and performs the user authentication by using a result of such identification.

Next, in S410, the security deciding unit 211 decides whether or not the user authentication succeeds. The success of the user authentication means that the user has verified that he/she has legitimate authority to use the terminal. On the other hand, failure (unsuccess) of the user authentication means that the user has not verified that he/she has legitimate authority to use the terminal. As a result of the decision, when the user authentication does not succeed (or fails), the process proceeds to S412 described above. Then, as described above, the security deciding unit 211 instructs the application processing unit 214 to transition to the screen in the unauthenticated state. Then, the process according to the flow chart of FIG. 4 ends.

On the other hand, as a result of the decision in S410, when the user authentication succeeds, the process proceeds to S411.

In S411, the security deciding unit 211 instructs the application processing unit 214 to transition to the screen in an authenticated state. Upon receiving the relevant instruction, the application processing unit 214 activates the activation-target application specified in S404 as an authenticated state mode. Then, the process according to the flow chart of FIG. 4 ends.

In the above description, the process of detecting the swipe is stopped at the activation operation end point. However, it is unnecessary to always do so. For example, even if the continuation of the swipe is further detected after the activation operation end point, the process may be continued without changing the activation operation end point. That is, when the input operation is the passage of the activation operation end point, it may be possible to perform the user authentication of S409 and S410 without performing the process of S407.

Besides, when the application is activated after the process of the flow chart of FIG. 4 was performed, the process by the relevant application is started.

Subsequently, an example of a method of selecting an icon of the notification-state application and performing the user authentication by using the fingerprint authenticating device 108 mounted separately from the liquid crystal touch panel 107 will be described with reference to FIGS. 5A and 5B.

Figure 5A:
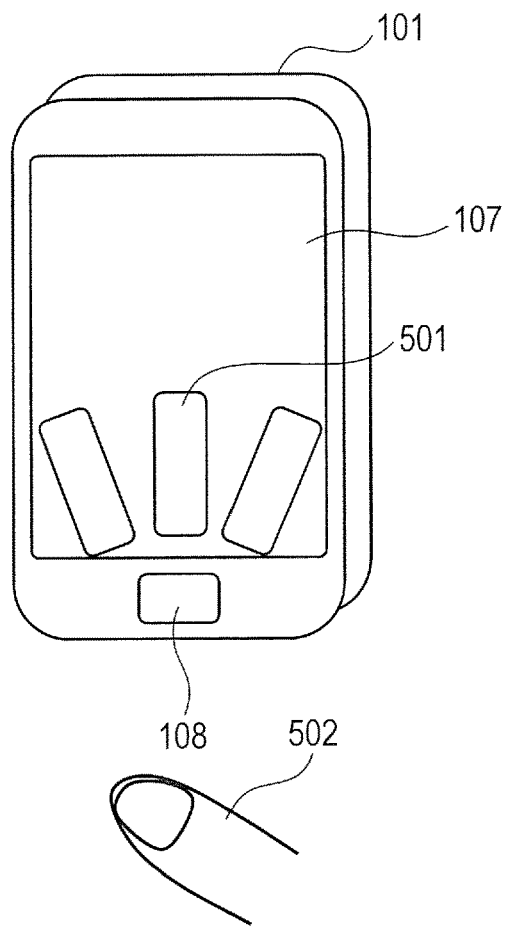
FIGS. 5A and 5B are diagrams for explaining a first specific example of the process according to the flow chart of FIG. 4.

FIG. 5A shows an example of the state in which the application processing unit 214 in the information processing apparatus 101 issues notification information by an application and the notification deciding unit 212 draws an icon 501 of the relevant application by using the displaying unit 220. This state corresponds to the state of S400 in FIG. 4. FIGS. 5A and 5B exemplarily show a case where a total of three icons are drawn on the screen of the liquid crystal touch panel 107, that is, one is drawn on each side of the icon 501. In the state shown in FIG. 5A, it is assumed that a user's finger 502 does not touch the relevant screen.

Figure 5B:
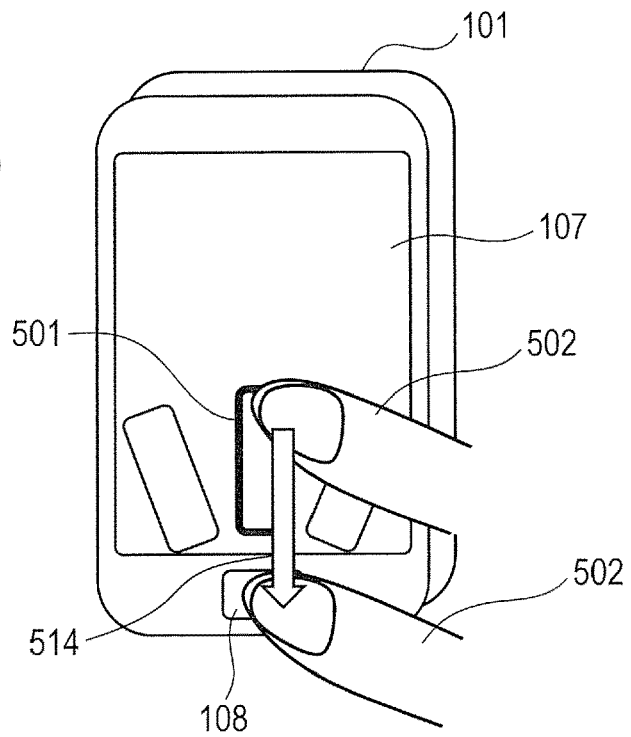

FIG. 5B shows an example of a method for realizing the icon selection and the user authentication by a series of the operations after the state shown in FIG. 5A. In FIG. 5B, the outline-arrow line indicates that the finger 502 moves. That is, the two fingers 502 shown in FIG. 5B do not exist at the same time respectively at the shown positions. Namely, the finger 502 which is placed at the position of the base end of the outline-arrow line at a certain time moves at a later time to the position of the tip of the outline-arrow line. It should be noted that such movement is also applied to FIGS. 6A and 6B, FIGS. 7A to 7C and FIGS. 10A and 10B which will be described later.

In FIG. 5B, first, the user touches, with the finger 502, the upper end portion of the icon 501 drawn on the screen of the liquid crystal touch panel 107. Here, the icon 501 is, out of the three icons, the icon of the application that the user intends to activate. It is assumed that the selection of the icon 501 is realized by a swipe from the upper end portion to the lower end portion. Incidentally, the direction of the selection by the swipe may be in other direction, such as from the lower end portion to the upper end portion. In FIG. 5B, the icon 501 is indicated by the bold line for the purpose of explanation. At this time, in S401, the selection deciding unit 213 detects the touch of the finger 502 to the icon 501.

After then, the user swipes the finger 502 in the downward direction of the icon 501 (the side of the fingerprint authenticating device 108). FIG. 5B shows the state in which the finger 502 is swiped to the lower end portion of the screen of the liquid crystal touch panel 107 and the touch point of the finger 502 has moved to the position of the fingerprint authenticating device 108.

When the swipe of the finger 502 is started in this way, in S402, the selection deciding unit 213 decides that the input operation to the screen is the swipe of the icon corresponding to the application from which the notification information was issued, and the process proceeds to S404. In S404, the selection deciding unit 213 sets the position at which the swipe to the icon 501 is started (the position at the upper end portion of the icon 501), as the activation operation start point. Further, the selection deciding unit 213 specifies the application corresponding to the icon 501 as the activation-target application. As just described, in the example shown in FIGS. 5A and 5B, a first operation is realized by, for example, the swipe to the icon 501 on the screen of the liquid crystal touch panel 107.

In the example shown in FIGS. 5A and 5B, the fingerprint authenticating device 108 is mounted as the inputting device 106 at the position other than the liquid crystal touch panel 107. Therefore, in S405, the security deciding unit 211 sets the activation operation end point at the position of the fingerprint authenticating device 108. Moreover, the security deciding unit sets, out of the intersections between the straight line mutually connecting the activation operation end point and the fingerprint authenticating device 108 with each other and the edge of the liquid crystal touch panel 107, the position closest to the fingerprint authenticating device 108 as an authentication acceptance start point 514.

In the example shown in FIG. 5B, the finger 502 is moved to the activation operation end point (the fingerprint authenticating device 108). Therefore, in S406, the selection deciding unit 213 decides that the direction of the input operation to the liquid crystal touch panel 107 is headed from the activation operation start point to the activation operation end point. After then, when the finger 502 passes through the authentication acceptance start point 514, the selection deciding unit 213 decides in S407 that the swipe operation has been completed. Thus, the fingerprint authenticating device 108 is activated. As just described, in the example shown in FIGS. 5A and 5B, for example, an example of a third operation is realized by the operation that the finger passes through the authentication acceptance start point 514.

In S408, the selection deciding unit 213 decides that the fingerprint authenticating device 108 set as the activation operation end point is in the state of being touched by the finger 502. As shown in FIG. 5B, since the finger 502 is on the fingerprint authenticating device 108, in S409, the security deciding unit 211 performs fingerprint authentication of the finger 502 (i.e., user authentication) by using the biometric authentication sensing unit 203 (the fingerprint authenticating device 108). As just described, in the example shown in FIGS. 5A and 5B, a second operation is realized by, for example, touching the fingerprint authenticating device 108.

Then, when it is decided in S410 that the fingerprint authentication succeeds, the security deciding unit 211 instructs in S411 the application processing unit 214 to transition to the screen in the authenticated state. Thus, the application which issued the notification information is activated. On the other hand, when it is decided in S410 that the fingerprint authentication does not succeed (or fails), the security deciding unit 211 instructs in S412 the application processing unit 214 to transition to the screen in the unauthenticated state.

Next, an example of a method of selecting the icon of a notification-state application and performing user authentication by using the fingerprint authenticating device 108 provided on the liquid crystal touch panel 107 will be described with reference to FIGS. 6A and 6B.

Figure 6A:
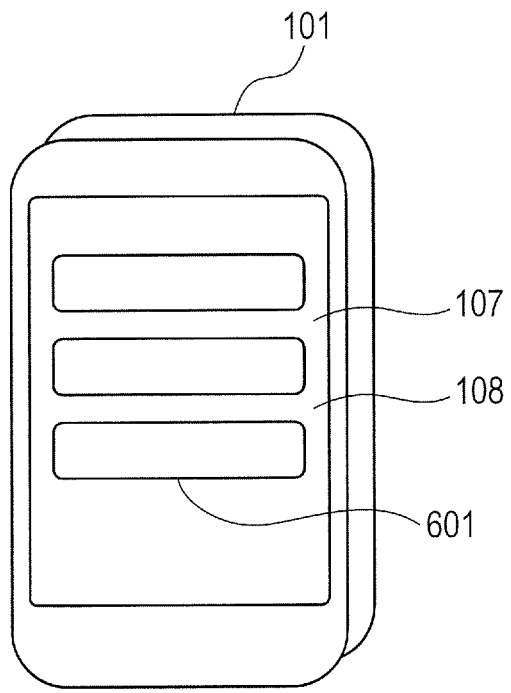
FIGS. 6A and 6B are diagrams for explaining a second specific example of the process according to the flow chart of FIG. 4.

FIG. 6A shows an example of the state in which, in the information processing apparatus 101, the application processing unit 214 issues the notification information by the application and the notification deciding unit 212 draws an icon 601 by using the displaying unit 220. This state corresponds to the state of S400 in FIG. 4.

Incidentally, a case where the fingerprint authenticating device 108 is mounted in the same area as the screen of the liquid crystal touch panel 107 and a fingerprint authentication action can be performed even supposing that which portion on the liquid crystal touch panel 107 is touched will be described as an example here.

Figure 6B:
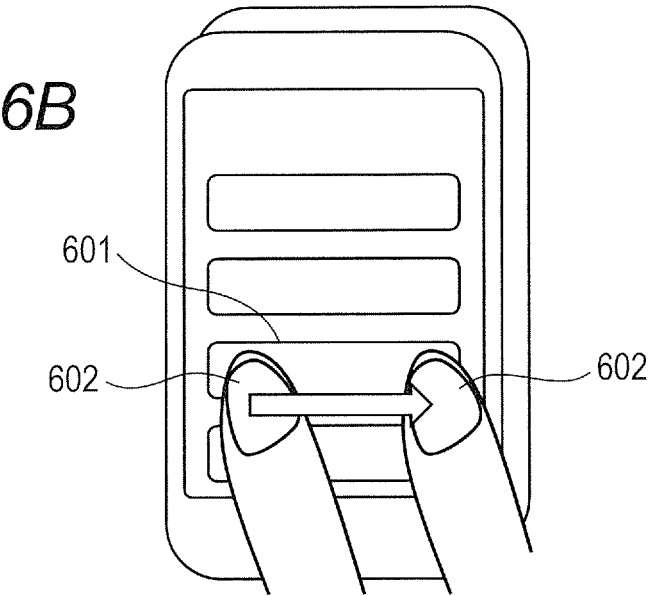

FIG. 6B shows an example of a method for realizing the icon selection and the user authentication by a series of the operations after the state shown in FIG. 6A.

In FIG. 6B, first, the user touches, with a finger 602, the left end portion of the icon 601 drawn on the screen of the liquid crystal touch panel 107. Then, in S401, the selection deciding unit 213 detects the touch of the finger 602 to the icon 601. It is assumed that the selection of the icon 601 is realized by the swipe from the left end portion to the right end portion. Here, the direction of the selection by the swipe may be in any direction such as the swipe from the right end portion to the left end portion, the swipe from the lower end portion to the upper end portion, or the swipe from the upper end portion to the lower end portion.

After then, the user swipes the finger 602 toward the right side of the icon 601. The state in which the finger 602 is swiped to the right end portion of the icon 601 is the state shown in FIG. 6B.

As just described, when the swipe of the finger 602 is started, the selection deciding unit 213 decides in S402 that the input operation to the screen is the swipe of the icon corresponding to the application from which the notification information was issued, and the process proceeds to S404. In S404, the selection deciding unit 213 sets the position at which the swipe of the icon 601 is started (the position at the left end portion of the icon 601) as the activation operation start point. Further, the selection deciding unit 213 specifies the application corresponding to the icon 601 as the activation-target application.

In the example shown in FIGS. 6A and 6B, the fingerprint authenticating device 108 is mounted on the liquid crystal touch panel 107. Therefore, in S405, the security deciding unit 211 sets the range of the icon 601 corresponding to the application from which the notification information was issued, as the fingerprint authentication decision area. Then, the security deciding unit 211 sets, as the activation operation end point, the right end portion which is the position assumed as the end point of the swipe performed to the icon 601. At this time, only the right end portion of the icon 601 may be set as the fingerprint authentication decision area.

In the example shown in FIG. 6B, the finger 602 is moved to the activation operation end point (the right end portion of the icon 601). Therefore, in S406, the selection deciding unit 213 decides that the direction of the input operation to the liquid crystal touch panel 107 is headed from the activation operation start point to the activation operation end point. After then, when the finger 602 passes through the right end portion of the icon 601, the selection deciding unit 213 decides in S407 that the swipe operation has been completed.

In S408, the selection deciding unit 213 decides that the finger 602 reaches the right end portion of the icon 601 set as the activation operation end point. After then, in S409, the security deciding unit 211 performs the fingerprint authentication of the finger 602 (that is, the user authentication) by using the biometric authentication sensing unit 203 (the fingerprint authenticating device 108). Incidentally, in S407, the fingerprint authentication may be performed at a stage before it is decided that the operation of the swipe is completed (that is, in the process of the swipe operation). As just described, in the example shown in FIGS. 6A and 6B, for example, the first operation is realized by the swipe to the icon 601 on the screen of the liquid crystal touch panel 107, and the second operation is realized by, for example, a part of the swipe.

When it is decided in S410 that the fingerprint authentication succeeds, the security deciding unit 211 instructs in S411 the application processing unit 214 to transition to the screen in the authenticated state. Thus, the application which issued the notification information is activated. On the other hand, when it is decided in S410 that the fingerprint authentication fails, the security deciding unit 211 instructs in S412 the application processing unit 214 to transition to the screen in the unauthenticated state.

Here, the example in which the fingerprint authentication is performed at the right end portion of the icon 601 after the selection of the application by the swipe has been described as above. However, it is not necessary to perform such an operation. For example, in FIGS. 6A and 6B, the gesture input may be adopted instead of the swipe to input the pattern as illustrated in FIG. 3. Further, for example, by tapping with the finger 602, the application selection and the fingerprint authentication may be performed, and the position of the application selection and the position of the fingerprint authentication may be made the same. As just described, all of the operations for selecting the application may be the operation for the fingerprint authentication.

Next, an example of a method of selecting an icon of a notification-state application and performing user authentication by using the pattern authentication will be described with reference to FIGS. 7A to 7C.

Figure 7A:
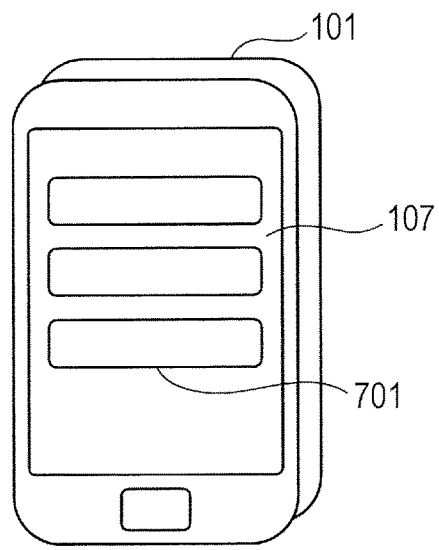
FIGS. 7A, 7B and 7C are diagrams for explaining a third specific example of the process according to the flow chart of FIG. 4.

FIG. 7A shows an example of the state in which, in the information processing apparatus 101, the application processing unit 214 issues the notification information by the application and the notification deciding unit 212 draws an icon 701 by using the displaying unit 220. This state corresponds to the state of S400 in FIG. 4.

Figure 7B:
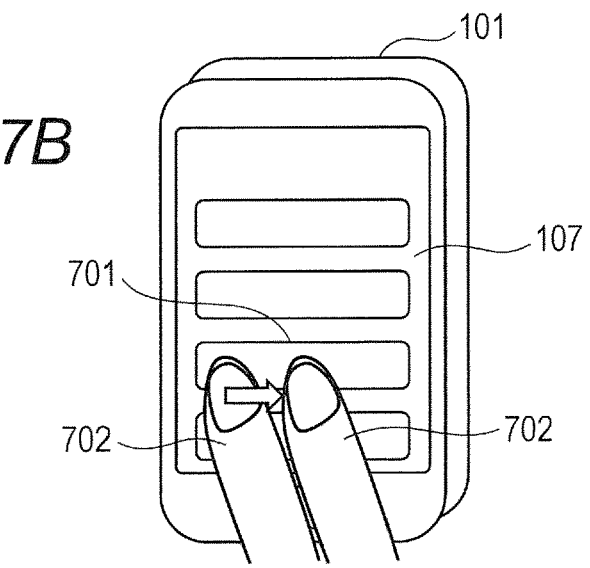

FIG. 7B shows an example of the state in which the icon 701 is being swiped. At this time, in S401, the selection deciding unit 213 detects the touch of a finger 702 to the icon 701.

It is assumed that the selection of the icon 701 is realized by the swipe from the left end portion to the right end portion of the icon. Here, the direction of the selection by the swipe may be in any direction such as the swipe from the right end portion to the left end portion, the swipe from the lower end portion to the upper end portion, or the swipe from the upper end portion to the lower end portion.

After then, when the user starts swiping the finger 602 toward the right side of the icon 701, in S402, the selection deciding unit 213 decides that the input operation to the screen is the swipe of the icon corresponding to the application from which the notification information was issued, and the process proceeds to S404. In S404, the selection deciding unit 213 sets the position at which the swipe to the icon 701 is started (the position at the left end portion of the icon 701), as the activation operation start point. Further, the selection deciding unit 213 specifies the application corresponding to the icon 701 as the activation-target application.

Figure 7C:
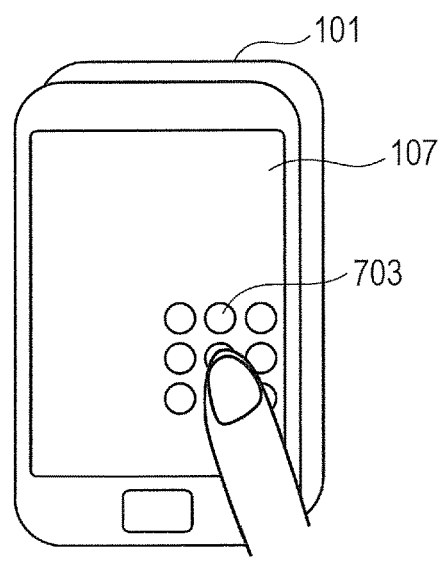

In the example shown in FIGS. 7A to 7C, the pattern authentication is performed. Therefore, in order to secure the drawing area of the pattern authentication view 703 shown in FIG. 7C, the security deciding unit 211 sets the activation operation end point at the position offset from the edge of the liquid crystal touch panel 107. Specifically, the activation operation end point is set to the position offset from the edge of the liquid crystal touch panel 107. For example, in a case where it is necessary to start the operation from the middle button among the buttons of the pattern authentication view 703 shown in FIG. 7C, the security deciding unit 211 sets the activation operation end point to the position on the left side of the drawing area of the middle button of the pattern authentication view 703. By doing so, it is possible to secure at least the area to be operated first, in the drawing area of the pattern authentication view 703. Incidentally, the activation operation end point may be set at a position on the left side of the entire drawing area of the pattern authentication view 703.

In the example shown in FIG. 7B, the finger 702 is moved to the activation operation end point (in the vicinity of the center of the icon 701). Therefore, in S406, the selection deciding unit 213 decides that the direction of the input operation to the liquid crystal touch panel 107 is headed from the activation operation start point to the activation operation end point. After then, when the finger 702 passes through the activation operation end point (in the vicinity of the center of the icon 701), the selection deciding unit 213 decides in S407 that the swipe operation has been completed. As just described, in the example shown in FIGS. 7A to 7C, the first operation is realized by, for example, the swipe to the icon 701 on the screen of the liquid crystal touch panel 107.

In S408, the selection deciding unit 213 decides that the finger 702 reaches the right end portion of the icon 701 set as the activation operation end point.

FIG. 7C shows an example of the state in which, after S408, the security deciding unit 211 has drawn the pattern authentication view 703 on the screen of the liquid crystal touch panel 107 in S409. In S409, the security deciding unit 211 performs the user authentication by using the pattern authentication. In the example shown in FIG. 7C, the user authentication is performed by comparing the operation pattern of the buttons drawn at the pattern authentication view 703 with a previously registered operation pattern. As described above, in the example shown in FIGS. 7A to 7C, the second operation is realized by, for example, operating the buttons drawn in the pattern authentication view 703 on the screen of the liquid crystal touch panel 107.

In S410, when it is decided by the security deciding unit 211 that the fingerprint authentication succeeds, the security deciding unit 211 instructs in S411 the application processing unit 214 to transition to the screen in the authenticated state. Thus, the application which issued the notification information is activated. When it is decided by the security deciding unit 211 that the fingerprint authentication fails, the security deciding unit 211 instructs in S412 the application processing unit 214 to transition to the screen in the unauthenticated state.

In the example shown in FIGS. 7A to 7C, the case where the user authentication is performed by using the pattern authentication after selecting the icon of the notification-state application has been described. However, such order as described above may be reversed.

Next, an example of a method of selecting the notification-state application by the gesture input and performing the user authentication by using the fingerprint authenticating device 108 mounted separately from the liquid crystal touch panel 107 will be described with reference to FIG. 8.

Figure 8:
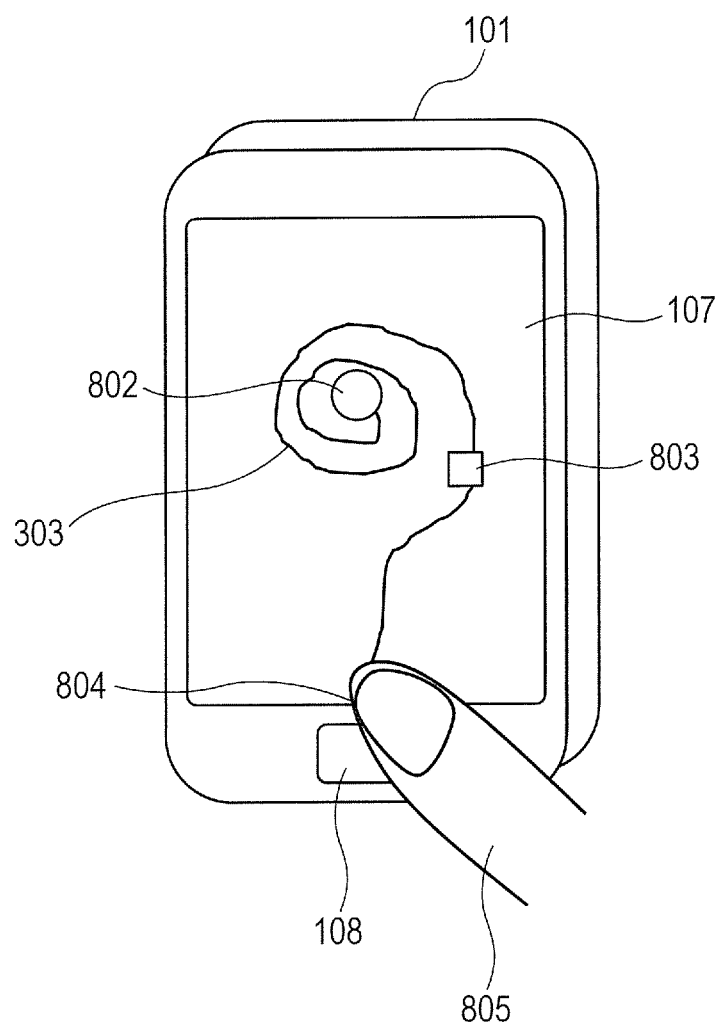
FIG. 8 is a diagram for explaining a fourth specific example of the process according to the flow chart of FIG. 4.

FIG. 8 shows an example of the state in which a finger 805 draws the gesture vector 303 of the mail application registered in the gesture table 300, and the fingerprint authentication is performed as a continuation of the drawing operation of the gesture vector 303, thereby activating the mail application.

In S401, the selection deciding unit 213 detects the input (that is, the touch of the finger 805), with the start point of the gesture drawn by the finger 805 on the screen of the liquid crystal touch panel 107 as a position 802. Incidentally, when performing the gesture input, in S400, after receiving the notification information issued by the application processing unit 214, the notification deciding unit 212 draws a gesture input screen instead of the notification information (icon). Then, in S402, the selection deciding unit 213 decides that the input operation to the screen is not the swipe of the icon corresponding to the application from which the notification information was issued, but is the gesture input, and the process proceeds to S403.

After then, the user draws the gesture vector 303 with the finger 805 on the screen of the liquid crystal touch panel 107. When an end point 803 of the gesture vector 303 is drawn in this manner, the process proceeds to S403. In S403, the gesture deciding unit 215 decides that the gesture vector drawn on the screen of the liquid crystal touch panel 107 is the gesture vector 303 registered in the gesture table 300. As just described, in the example shown in FIG. 8, the first operation is realized by the gesture input (the pattern input) on the screen of the liquid crystal touch panel 107.

In S404, the selection deciding unit 213 sets the end point 803 of the gesture vector 303 as the activation operation start point. Further, in the gesture table 300, the selection deciding unit 213 specifies the mail application which is the application type corresponding to the gesture vector 303 as the activation-target application.

In the example shown in FIG. 8, the fingerprint authenticating device 108 is mounted as the inputting device 106 at a position other than the liquid crystal touch panel 107. Therefore, in S405, the security deciding unit 211 sets the activation operation end point at the position of the fingerprint authenticating device 108. Further, the security deciding unit sets, out of the intersections between the straight line mutually connecting the activation operation end point (the end point 803 of the gesture vector 303) and the fingerprint authenticating device 108 with each other and the edge of the liquid crystal touch panel 107, the position closest to the fingerprint authenticating device 108 as an authentication acceptance start point 804.

In the example shown in FIG. 8, the finger 805 is moved to the activation operation end point (the fingerprint authenticating device 108) of the liquid crystal touch panel 107. Therefore, in S406, the selection deciding unit 213 decides that the direction of the input operation to the liquid crystal touch panel 107 is headed from the activation operation start point to the activation operation end point. After then, when the finger 805 passes through the authentication acceptance start point 804, the selection deciding unit 213 decides in S407 that the operation to the screen of the liquid crystal touch panel 107 has been completed. Thus, the fingerprint authenticating device 108 is activated. As just described, in the example shown in FIG. 8, for example, an example of the third operation is realized by the operation passing through the authentication acceptance start point 804.

In S408, the selection deciding unit 213 decides that the fingerprint authenticating device 108 set as the activation operation end point is in the state of being touched by the finger 805. As shown in FIG. 8, since the finger 805 is on the fingerprint authenticating device 108, the security deciding unit 211 performs in S409 the fingerprint authentication of the finger 502 (i.e., the user authentication) by using the biometric authentication sensing unit 203 (the fingerprint authenticating device 108). As just described, in the example shown in FIG. 8, the second operation is realized by, for example, touching the fingerprint authenticating device 108.

Then, when it is decided in S410 that the fingerprint authentication succeeds, the security deciding unit 211 instructs in S411 the application processing unit 214 to transition to the screen in the authenticated state. Thus, the application which issued the notification information is activated. On the other hand, when it is decided in S410 that the fingerprint authentication fails, the security deciding unit 211 instructs in S412 the application processing unit 214 to transition to the screen in the unauthenticated state.

Also, when selecting the notification-state application by the gesture input, it is possible to adopt the form in which the fingerprint authenticating device 108 is mounted on the liquid crystal touch panel 107. That is, the fingerprint authentication may be performed from the finger which is being touched on the screen of the liquid crystal touch panel 107 at the beginning, the middle or the end of the gesture input shown in FIG. 8.

Also, when selecting the notification-state application by the gesture input, it is possible to perform the user authentication by using the pattern authentication view described with reference to FIGS. 7A to 7C. At this time, as described with reference to FIGS. 7A to 7C, it is preferable to offset the position of the gesture input.

As described above, in the present embodiment, the acceptance of the operation for selecting the application to be activated and the subsequent acquisition of the information to be used for the user authentication are performed based on the series of the operations by the user. Therefore, it is possible for the user who started the operation for selecting the application to be activated to perform the user authentication, without newly performing the operation for the user authentication by breaking the relevant selection operation (remarkably). Thus, it is possible to smoothly activate the application.

Second Embodiment

Next, the second embodiment will be described. In the first embodiment, the case where the acceptance of the operation for selecting the application to be activated and the subsequent acquisition of the information to be used for the user authentication are performed has been described as the example. However, as the method of, based on the series of the operations by the user, performing the acceptance of the operation for selecting the application to be activated and the acquisition of the information to be used for the user authentication, it is also possible to conceive the order opposite to the order of the first embodiment. That is, the acquisition of the information necessary for the user authentication and the subsequent acceptance of the operation for selecting the application to be activated may be performed. In the present embodiment, such a case will be described. As just described, the present embodiment and the first embodiment are mainly different in the point related to the process to be performed due to the different order of the acceptance of the operation for selecting the application to be activated and the acquisition of the information necessary for the user authentication. Therefore, in the description of the present embodiment, the same parts as those described in the first embodiment are denoted by the same reference numerals as those illustrated in FIGS. 1 to 8, and the detailed description thereof will be omitted. For example, in the present embodiment, FIG. 1 indicating the hardware constitution of the information processing apparatus 101, FIG. 2 indicating the functional constitution of the information processing apparatus 101, and FIG. 3 indicating the gesture table 300 are the same as those described in the first embodiment.

Figure 9:
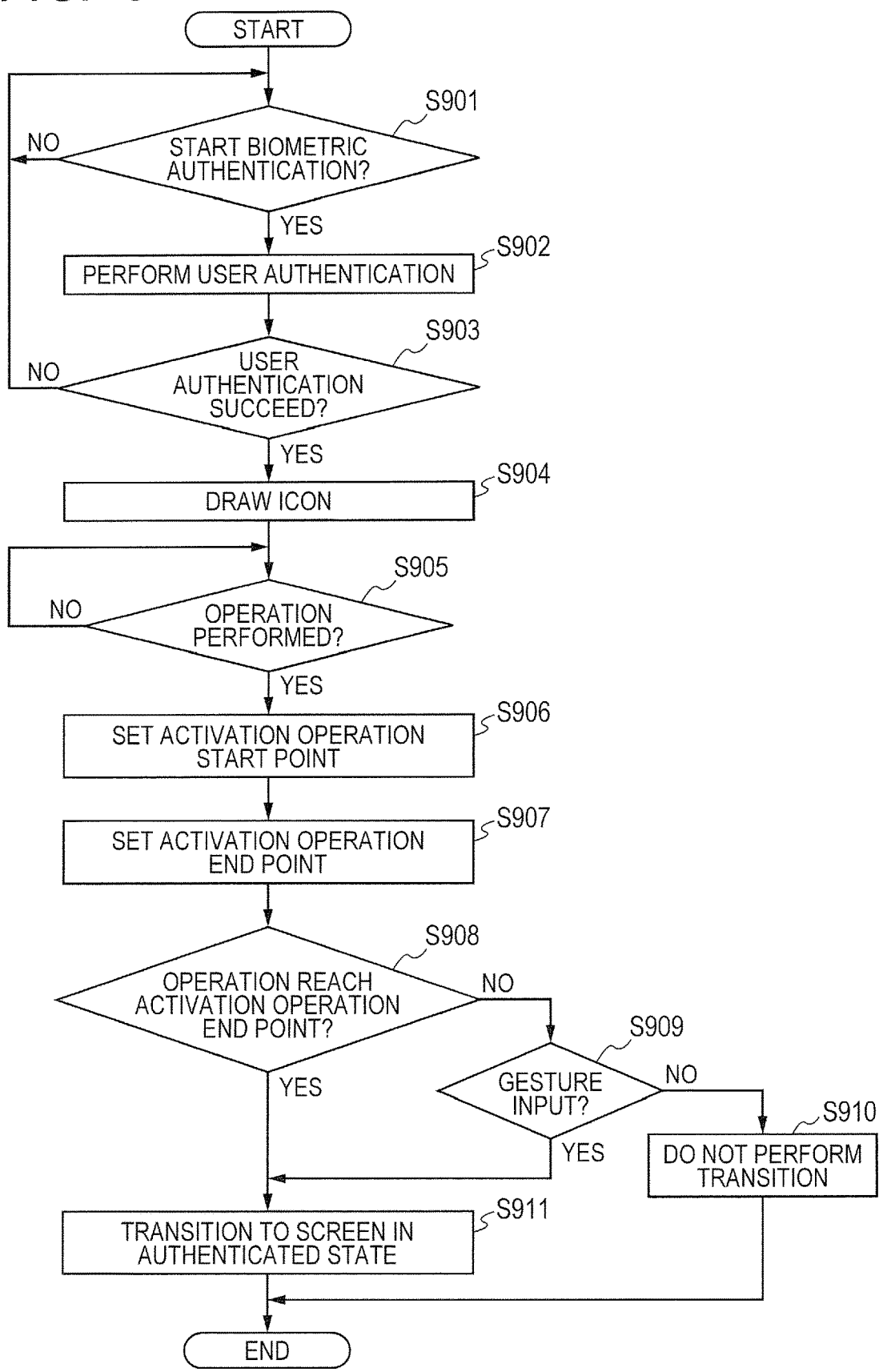
FIG. 9 is a flow chart for explaining a second example of the process to be performed by the information processing apparatus.

FIG. 9 is a flow chart for explaining an example of the process to be performed by the information processing apparatus 101 at the time of selecting and activating the notification-state application when the user authentication is completed. Here, a case where the biometric authentication is used as the user authentication will be described as an example.

In S901, the biometric authentication sensing unit 203 decides whether or not the biometric authentication can be started. As a result of the decision, when the biometric authentication cannot be started, the decision in S901 is continued. Then, when the biometric authentication can be started, the process proceeds to S902. In S902, the security deciding unit 211 performs the user authentication by using the biometric authentication sensing unit 203.

Next, in S903, the security deciding unit 211 decides whether or not the user authentication succeeds. As a result of the decision, when the user authentication does not succeed (or fails), the process returns to S901. On the other hand, when the user authentication succeeds, the process proceeds to S904. As just described, in the present embodiment, an example of the authentication information is realized by, for example, information of a fingerprint.

In S904, the notification deciding unit 212 draws the icon of the application which issued the notification information, by using the displaying unit 220. It should be noted that the relevant icon is the icon which can be swiped.

In S905, the selection deciding unit 213 decides whether or not a touch input operation is performed to the liquid crystal touch panel 107, and waits until the operation is performed to the liquid crystal touch panel 107. Then, when the operation is performed to the liquid crystal touch panel 107, the process proceeds to S906.

In S906, the selection deciding unit 213 sets the position where the operation was performed to the liquid crystal touch panel 107, as the activation operation start point. Also, the selection deciding unit 213 specifies the icon drawn at the position where the operation was performed, and specifies the application corresponding to the specified icon as the activation-target application.

Incidentally, the activation operation start point may be set in the area between the icon drawn at the position where the operation was performed and the fingerprint authenticating device 108. For example, out of the intersections between the (virtual) straight line mutually connecting the (the center of) the fingerprint authenticating device 108 and (the center of) of the icon drawn at the position where the operation was performed and the edge of the liquid crystal touch panel 107, the position closest to the fingerprint authenticating device 108 may be set as the activation operation start point. Further, the activation operation start point may be a position itself or a predetermined area including the relevant position.

Next, in S907, the selection deciding unit 213 sets, as the activation operation end point, a position which is assumed as the end point of the swipe performed on the icon specified in S906. Incidentally, the activation operation end point may be a position itself assumed to be the end point of the swipe, or may be a predetermined area including the relevant position.

Next, in S908, the selection deciding unit 213 decides whether or not the position of the operation performed to the liquid crystal touch panel 107 reaches the activation operation end point. As a result of the decision, when the position of the operation performed to the liquid crystal touch panel 107 reaches the activation operation end point, the process proceeds to S911.

In S911, the security deciding unit 211 instructs the application processing unit 214 to transition to the screen in the authenticated state. Upon receiving such an instruction, the application processing unit 214 activates the activation-target application specified in S906 as the authenticated state mode. Then, the process according to the flow chart of FIG. 9 ends.

On the other hand, as a result of the decision in S908, when the position of the operation performed to the liquid crystal touch panel 107 does not reach the activation operation end point, the process proceeds to S909. In S909, the gesture deciding unit 215 collates the gesture vector 302 registered in the gesture table 300 with the trajectory of the operation performed to the liquid crystal touch panel 107. Then, the gesture deciding unit 215 decides whether or not the operation to the liquid crystal touch panel 107 is a gesture input. When the trajectory of the operation performed to the liquid crystal touch panel 107 matches any one of the gesture vectors 302 registered in the gesture table 300, the gesture deciding unit 215 decides that the operation to the liquid crystal touch panel 107 is the gesture input.

As a result of the decision, when the operation to the liquid crystal touch panel 107 is not the gesture input, the process proceeds to S910. In S910, the application processing unit 214 does not perform the screen transition because there is no application to be activated. Further, instead of performing the screen transition, the application processing unit 214 may display an error such as "screen transition impossible" by using the displaying unit 220.

On the other hand, as a result of the decision in S909, when the operation to the liquid crystal touch panel 107 is the gesture input, the process proceeds to S911. In S911, in the gesture table 300, the gesture deciding unit 215 specifies, as the activation-target application, the application corresponding to the gesture vector matching the trajectory of the operation to the liquid crystal touch panel 107. Then, the security deciding unit 211 instructs the application processing unit 214 to transition to the screen in the authenticated state. Upon receiving such an instruction, the application processing unit 214 activates the specified activation-target application as the authenticated state mode. Then, the process according to the flow chart of FIG. 9 ends.

Next, an example of a method of selecting the application to be activated subsequent to the fingerprint authentication will be described with reference to FIGS. 10A and 10B.

Figure 10A:
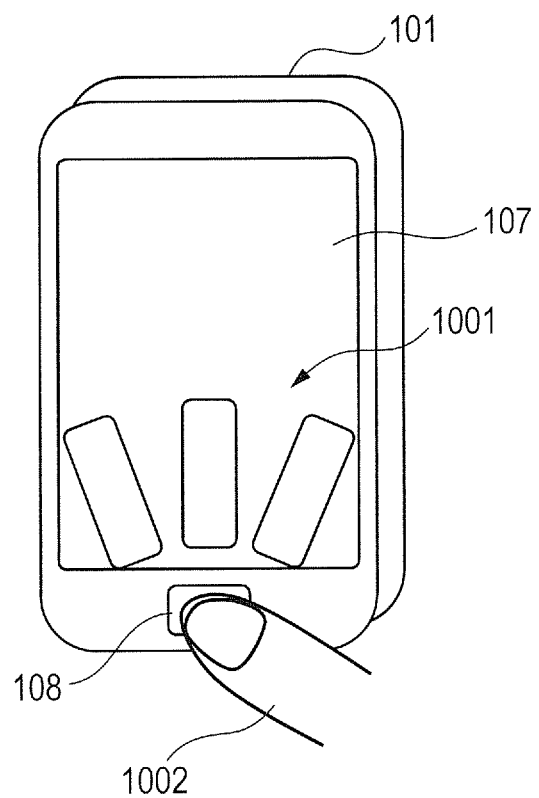
FIGS. 10A and 10B are diagrams for explaining a fourth specific example of the process according to the flow chart of FIG. 9.
Figure 10B:
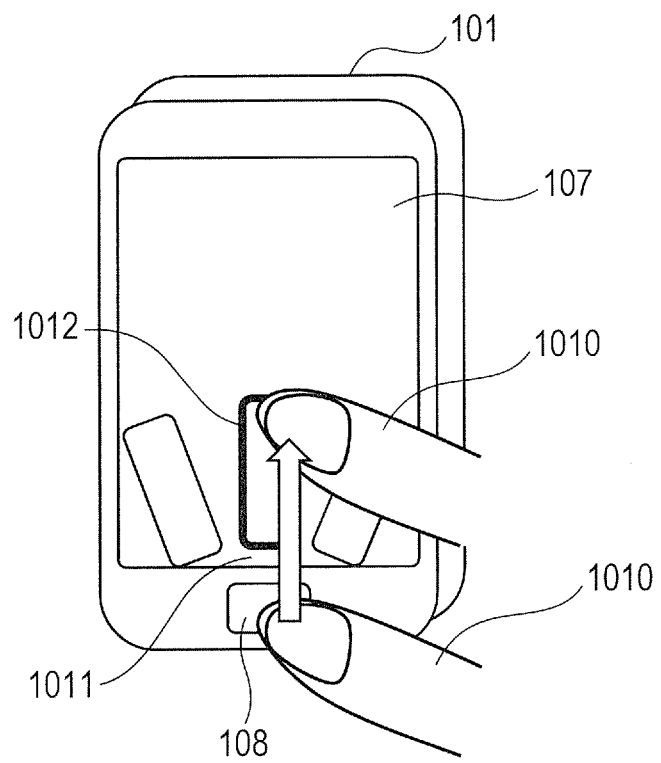

FIGS. 10A and 10B exemplarily show a case where the fingerprint authenticating device 108 is mounted separately from the liquid crystal touch panel 107.

FIG. 10A shows an example of the state that the application selectable subsequent to the fingerprint authentication is drawn as an icon.

In FIG. 10A, when a finger 1002 is touching the mounting position of the fingerprint authenticating device 108, the biometric authentication sensing unit 203 decides in S901 that the biometric authentication can be started. Then, in S902, the security deciding unit 211 performs the user authentication by using the biometric authentication sensing unit 203. In this state, an icon group 1001 is not displayed. As just described, in the example shown in FIGS. 10A and 10B, the second operation is realized by, for example, touching the fingerprint authenticating device 108.

In S903, when the security deciding unit 211 decides that the user authentication succeeds, the notification deciding unit 212 displays in S904 the icon of the application which issued the notification information, in the vicinity of the mounting position of the fingerprint authenticating device 108. Here, there are the three applications which respectively issued the notification information at the time of the success of the user authentication, and the three icons are drawn in total respectively for these three applications. The icon group 1001 consists of these three icons.

FIG. 10B shows an example of the state that the operation for selecting any one of the drawn icons in the icon groups 1001.

In FIG. 10B, the user starts swiping a finger 1010 to an icon 1012. In S905, when the selection deciding unit 213 decides that the swipe operation occurs, the selection deciding unit 213 sets in S906 the position where the swipe operation occurs as the activation operation start point. Incidentally, in S906, the activation operation start point may be set in an area 1011 between the icon drawn at the position where the operation occurs and the fingerprint authenticating device 108. In any case, the application corresponding to the icon 1012 is specified as the activation-target application.

In S907, the selection deciding unit 213 sets a position which is assumed to be the end point of the swipe performed to the icon 1012, as the activation operation end point.

Next, in S908, when the selection deciding unit 213 decides that the finger 1010 reaches the activation operation end point, the process proceeds to S911. In S911, the security deciding unit 211 decides that selection of the application to be activated is completed, and thus instructs the application processing unit 214 to transition to the screen in the authenticated state. Upon receiving the relevant instruction, the application processing unit 214 activates the application corresponding to the icon 1012 as the authenticated state mode. As just described, in the example shown in FIGS. 10A and 10B, the first operation is realized by, for example, the swipe to the icon 1012 on the screen of the liquid crystal touch panel 107.

As described above, even if the acquisition of the information necessary for the user authentication and the subsequent acceptance of the operation for selecting the application to be activated are performed based on the series of the operations by the user, the same effect as that described in the first embodiment can be obtained. Also, in the present embodiment, the example described in the first embodiment can be adopted. For example, the fingerprint authenticating device 108 is mounted on the liquid crystal touch panel 107, and the point (the activation operation start point) at which the operation to the icon corresponding to the application to be activated is started is touched by the finger. At this point of time, it is possible to detect the fingerprint of the relevant finger and thus perform the user authentication. In this case, for example, in FIGS. 6A and 6B, it is possible to perform the fingerprint authentication when the finger 602 touches the range of the icon 601. Besides, it is possible to adopt the gesture input instead of the swipe. In this case, for example, it is possible to perform the operation in the procedure reverse to that described in FIG. 8 (that is, the order of the fingerprint authenticating device 108, the authentication acceptance start point 804, the end point 803 and the position 802). Further, it may be possible to replace the icon group 1001 with the gesture input screen, without providing the authentication acceptance start point 804. Also, it is possible to adopt the pattern authentication instead of the fingerprint authentication. In this case, for example, in FIGS. 7A to 7C, it is possible, after performing the pattern authentication by the input to the pattern authentication view 703, to swipe the finger 702 in the direction opposite to the outline-arrow line shown in FIG. 7B. At this time, it is possible to set the activation operation start point at a position offset from the edge of the liquid crystal touch panel 107, so that the activation operation start point is out of the area of the pattern authentication view 703.

Third Embodiment

Next, the third embodiment will be described. In the first and second embodiments, the case where the completion of accepting the operation for selecting the application to be activated and the acquisition of the information necessary for the user authentication are performed at different timings has been described as the example. On the other hand, in the present embodiment, a case where the acceptance of the operation for selecting the application to be activated and the acquisition of the information necessary for the user authentication are performed simultaneously will be described as an example. As just described, the present embodiment is mainly different from the first and second embodiments in the point of the timings of the acceptance of the operation for selecting the application to be activated and the acquisition of the information necessary for the user authentication. Therefore, in the description of the present embodiment, the same parts as those in the first and second embodiments are denoted by the same reference numerals as those illustrated in FIGS. 1 to 10B, and the detailed description thereof will be omitted. For example, in the present embodiment, FIG. 1 indicating the hardware constitution of the information processing apparatus 101 and FIG. 2 indicating the functional constitution of the information processing apparatus 101 are the same as those described in the first embodiment.

Here, an example of a method of realizing the operation for the user authentication and the operation for selecting the application to be activated, without transitioning the screen will be described. The touch operation for selecting the application and the touch operation for the user authentication exist simultaneously to the screen of the liquid crystal touch panel 107. However, the relevant touch operations are not necessarily started simultaneously.

Figure 11:
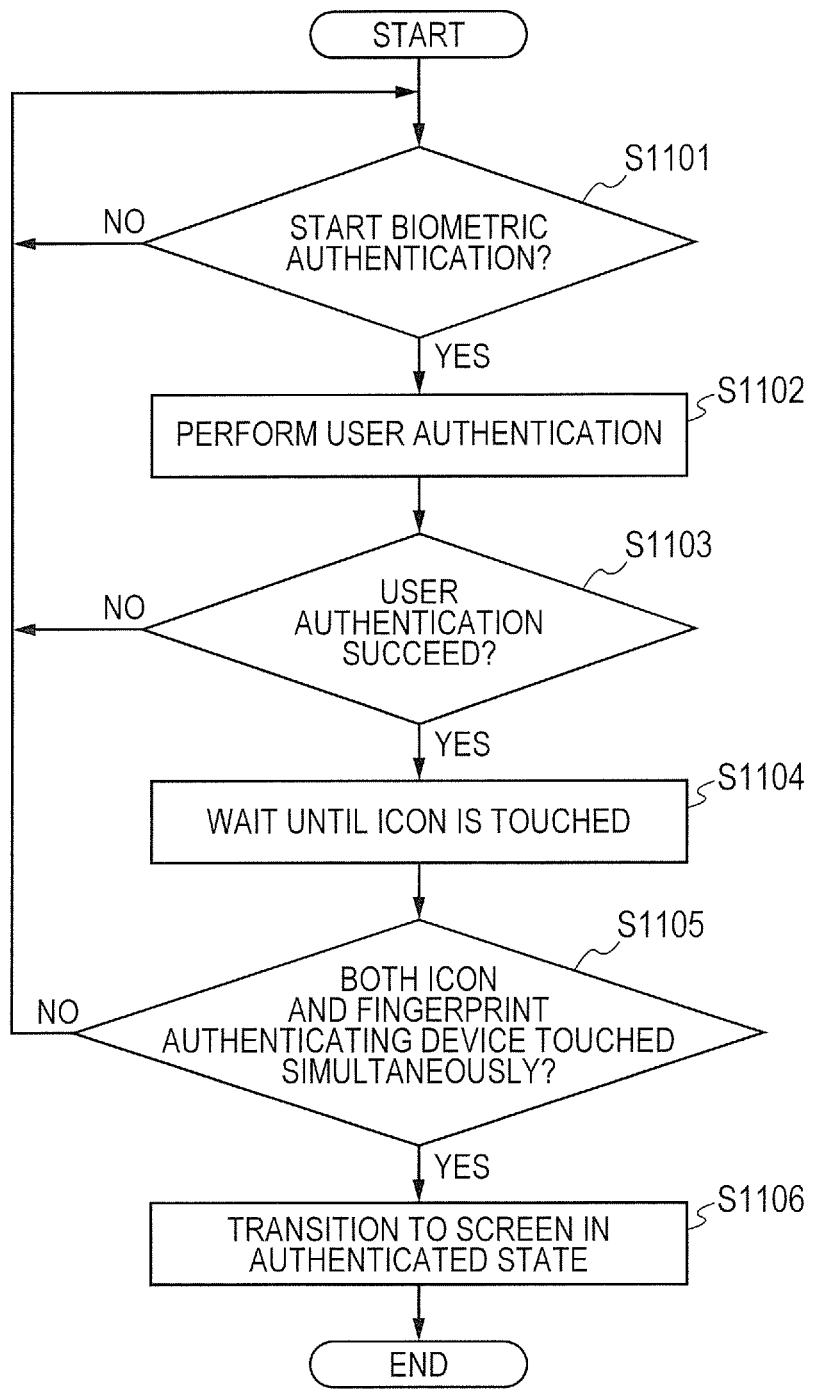
FIG. 11 is a flow chart for explaining a third example of the process to be performed by the information processing apparatus.

FIG. 11 is a flow chart for explaining an example of the process to be performed by the information processing apparatus 101 at the time of selecting and activating the notification-state application when the user authentication is completed. Here, a case where the biometric authentication is used as the user authentication will be described as an example. It is assumed that, before the process of the flow chart of FIG. 11 is started, the process of displaying the icon of the application which issued the notification information on the screen of the liquid crystal touch panel 107 has been performed.

In S1101, the biometric authentication sensing unit 203 decides whether or not the biometric authentication can be started. As a result of the decision, when the biometric authentication cannot be started, the decision of S1101 is continued. Then, when the biometric authentication can be started, the process proceeds to S1102. In S1102, the security deciding unit 211 performs the user authentication by using the biometric authentication sensing unit 203.

Next, in S1103, the security deciding unit 211 decides whether or not the user authentication succeeds. As a result of the decision, when the user authentication does not succeed (or fails), the process returns to S1101. On the other hand, when the user authentication succeeds, the process proceeds to S1104. As just described, in the present embodiment, an example of the authentication information is realized by, for example, information of a fingerprint.

In S1104, the selection deciding unit 213 waits until the icon of the application which issued the notification information is touched. Then, when the icon of the application which issued the notification information is touched, the selection deciding unit 213 specifies the application corresponding to the relevant icon as the activation-target application.

When the icon of the application which issued the notification information is touched, the process proceeds to S1105. In S1105, the selection deciding unit 213 decides whether or not both the icon of the application which issued the notification information and the fingerprint authenticating device 108 (sensor detection area) are touched simultaneously. As a result of the decision, when both the icon and the device are not touched simultaneously, the process returns to S1101. On the other hand, when both the icon and the device are touched simultaneously, the process proceeds to S1106.

In S1106, the security deciding unit 211 instructs the application processing unit 214 to transition to the screen in the authenticated state. Upon receiving the relevant instruction, the application processing unit 214 activates the application specified as the activation-target application in S1104, as the authenticated state mode. Then, the process according to the flow chart of FIG. 11 ends.

Next, an example of a method of activating the application as the authenticated state mode, by simultaneously tapping the fingerprint authenticating device 108 and the icon of the application will be described with reference to FIGS. 12A and 12B.

Figure 12A:
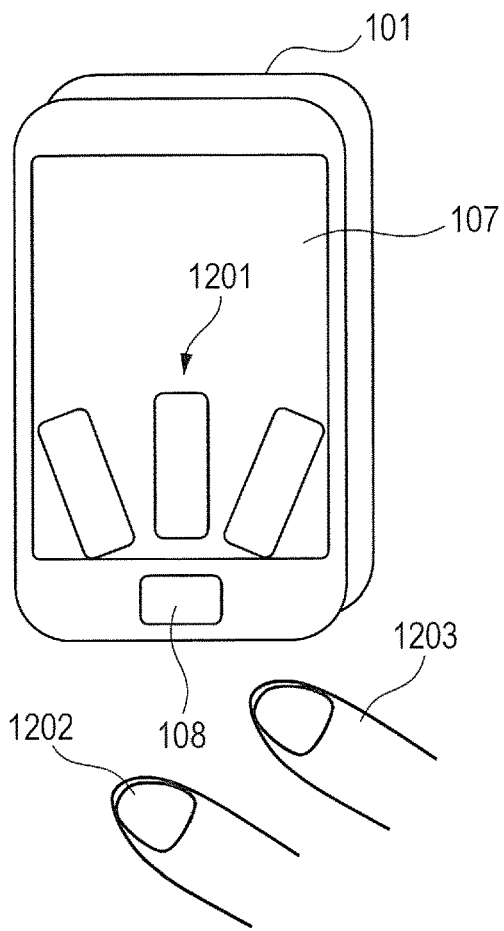
FIGS. 12A and 12B are diagrams for explaining a fourth specific example of the process according to the flow chart of FIG. 11.

FIG. 12A shows an example of the state in which the icon of the notification-state application is drawn on the screen of the liquid crystal touch panel 107.

Upon receiving the notification from the application processing unit 214, the notification deciding unit 212 draws the icon of the notification-state application by using the displaying unit 220. Thus, as shown in FIG. 12A, an icon group 1201 of the application is displayed on the screen of the liquid crystal touch panel 107.

Figure 12B:
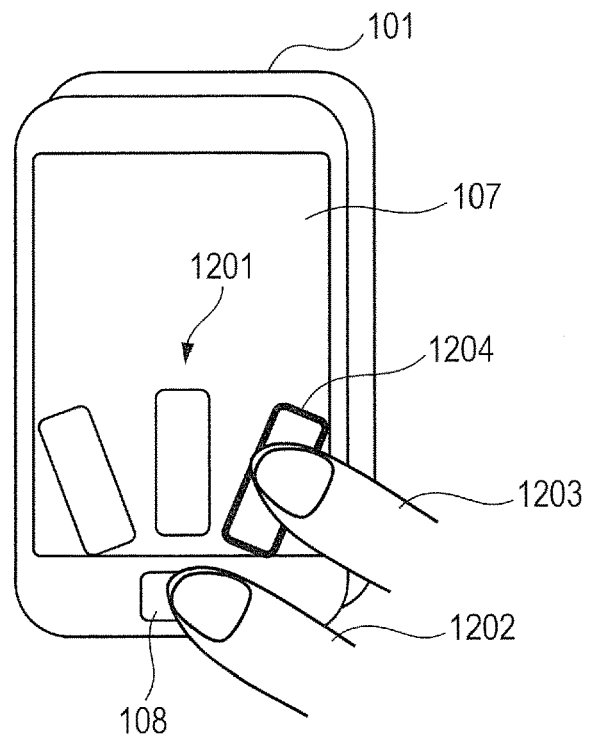

FIG. 12B shows an example of the state in which the touch to the icon of the notification-state application and the touch to the fingerprint authenticating device 108 are simultaneously performed.

In the state shown in FIG. 12B, the biometric authentication sensing unit 203 decides in S1101 that a finger 1202 is touching the fingerprint authenticating device 108, and the security deciding unit 211 performs in S1102 the user authentication by the fingerprint authentication of the finger 1202. Then, when the security deciding unit 211 decides in S1103 that the user authentication succeeds, the selection deciding unit 213 specifies in S1104 an icon 1204 tapped with the finger 1203. In FIG. 12B, the relevant icon 1204 is indicated by the bold line for the purpose of description.

In S1105, the selection deciding unit 213 decides that the icon 1204 and the fingerprint authenticating device 108 are respectively touched touched by the fingers 1203 and 1202 simultaneously, and the process proceeds to S1106. In S1106, the application processing unit 214 activates the application corresponding to the icon 1012 as the authenticated state mode. As just described, in the example shown in FIGS. 12A and 12B, the first operation is realized by, for example, the swipe to the icon 1204 on the screen of the liquid crystal touch panel 107, and the second operation is realized by, for example, touching the fingerprint authenticating device 108.

As described above, even if the operation for selecting the application to be activated and the acquisition of the information necessary for the user authentication are performed simultaneously, it is possible to obtain the same effects as those described in the first and second embodiments.

In the present embodiment, the case where the fingerprint authenticating device 108 is mounted at the position other than the liquid crystal touch panel 107 has been described as the example. However, even when the fingerprint authenticating device 108 is mounted on the liquid crystal touch panel 107, it is possible to simultaneously perform the operation for selecting the application to be activated and the acquisition of the information necessary for the user authentication. For example, in FIGS. 12A and 12B, it only has to provide an area for the fingerprint authentication in the area of the screen of the liquid crystal touch panel 107 other than the icon group 1201. Also, in the present embodiment, it is possible to minimize various modifications described in the first and second embodiments.

Besides, in each of the embodiments described above, the method of selecting the application and the user authentication by the series of the operations has been described. However, the application selecting method and the user authenticating method need not be only the combination described above.

Further, in each of the above embodiments, the case of selecting the icon of the application which notified the notification information has been described as the example. However, the selection-target application is not limited to the application like this. Namely, it may be possible to use any application as long as it is the application installed in the information processing apparatus 101.

Incidentally, it is to be noted that all of the above-described embodiments merely show the examples of the actualization in the case where the invention is carried out, and the technical scope of the invention should not be interpreted restrictively by these embodiments. That is, the invention can be carried out in various forms without departing from its technical idea or its main features.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-039299, filed Mar. 1, 2016, which is hereby incorporated by reference herein in its entirety.

What is claimed is:

1. An information processing apparatus comprising:
at least one processor; and
a memory including processor-executable instructions that, when executed by the at least one processor, cause the information processing apparatus to:
receive a notification indicating an attention for activating an application;
move icons of the application from originally displayed positions, so that the icons gather around an area where a fingerprint authentication is performed;
accept a first operation of indicating an instruction to select an icon of the icons of the application;
acquire authentication information to be used for user authentication, based on the fingerprint authentication;
track that the first operation is continuously performed so as to approach the area where the fingerprint authentication is performed, and the fingerprint authentication is performed during the first operation; and
activate the application corresponding to the icon selected by the first operation, in a case where a predetermined user is identified based on the authentication information.

2. The information processing apparatus according to claim 1, wherein the tracking ends in a predetermined time, and a state that the application is being selected by the first operation is maintained for the predetermined time.

3. The information processing apparatus according to claim 1, wherein the first operation is performed to a touch panel, and the fingerprint authentication is performed in the area different from the touch panel, and
wherein the processor-executable instructions, when executed by the at least one processor, cause the information processing apparatus to track that the first operation passes through a boundary of the touch panel and then reaches the area where the fingerprint authentication is performed.

4. The information processing apparatus according to claim 1, wherein the processor-executable instructions, when executed by the at least one processor, further cause the information processing apparatus to draw an image for guiding a direction in which the first operation is performed to head toward the area where the fingerprint authentication is performed.

5. The information processing apparatus according to claim 1, wherein the instruction is to activate the application.

6. The information processing apparatus according to claim 1, wherein the acceptance is performed on a locked screen.

7. The information processing apparatus according to claim 1, wherein the first operation includes a slide operation.

8. The information processing apparatus according to claim 1, wherein the first operation indicates the instruction to select the application from a plurality of applications.

9. The information processing apparatus according to claim 1, wherein the first operation includes a predetermined pattern operation for each individual application.

10. The information processing apparatus according to claim 1, wherein the authentication information includes fingerprint information.

11. An information processing method comprising:
   receiving a notification indicating an attention for activating an application;
   moving icons of the application from originally displayed positions, so that the icons gather around an area where a fingerprint authentication is performed;
   accepting a first operation of indicating an instruction to select an icon of the icons of the application;
   acquiring authentication information to be used for user authentication, based on the fingerprint authentication;
   tracking that the first operation is continuously performed so as to approach the area where the fingerprint authentication is performed, and the fingerprint authentication is performed during the first operation; and
   activating the application corresponding to the icon selected by the first operation, in a case where a predetermined user is identified based on the authentication information.

12. A non-transitory computer-readable storage medium of storing a program to cause a computer to perform an information processing method comprising:
   receiving a notification indicating an attention for activating an application;
   moving icons of the application from originally displayed positions, so that the icons gather around an area where a fingerprint authentication is performed;
   accept accepting a first operation of indicating an instruction to select an icon of the icons of the application;
   acquiring authentication information to be used for user authentication, based on the fingerprint authentication;
   tracking that the first operation is continuously performed so as to approach the area where the fingerprint authentication is performed, and the fingerprint authentication is performed during the first operation; and
   activating the application corresponding to the icon selected by the first operation, in a case where a predetermined user is identified based on the authentication information.

\* \* \* \* \*